US012750640B2

(12) United States Patent
Alvarez Dominguez et al.

(10) Patent No.: US 12,750,640 B2
(45) Date of Patent: Sep. 29, 2026

(54) TECHNIQUE FOR ENRICHING USER PLANE TRAFFIC IN A CORE NETWORK DOMAIN WITH SENSUAL CONTENT

(71) Applicant: Telefonaktiebolaget LM Ericsson (publ), Stockholm (SE)

(72) Inventors: Rodrigo Alvarez Dominguez, Madrid (ES); Miguel Angel Muñoz De La Torre Alonso, Madrid (ES)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 88 days.

(21) Appl. No.: 18/841,764

(22) PCT Filed: Apr. 4, 2022

(86) PCT No.: PCT/EP2022/058857
§ 371 (c)(1),
(2) Date: Aug. 27, 2024

(87) PCT Pub. No.: WO2023/165717
PCT Pub. Date: Sep. 7, 2023

(65) Prior Publication Data

US 2025/0175766 A1 May 29, 2025

(30) Foreign Application Priority Data

Mar. 1, 2022 (EP) .................................... 22382176

(51) Int. Cl.
*H04W 4/18* (2009.01)
*H04L 67/141* (2022.01)

(52) U.S. Cl.
CPC ........... *H04W 4/185* (2013.01); *H04L 67/141* (2013.01)

(58) Field of Classification Search
CPC ................. H04W 4/185; H04L 67/141; H04N 21/23614; H04N 21/25833; H04N 21/6582
See application file for complete search history.

(56) References Cited

U.S. PATENT DOCUMENTS

2007/0258460 A1* 11/2007 Momtahan .............. H04L 67/60 370/395.2
2012/0281138 A1* 11/2012 Choi ................ H04N 21/43615 348/460
2013/0073684 A1 3/2013 Gutierrez
2014/0115140 A1* 4/2014 Jin ........................ H04L 67/303 709/223

(Continued)

OTHER PUBLICATIONS

International Search Report and Written Opinion dated Oct. 21, 2022 for International Application No. PCT/EP2022/058857 filed Apr. 4, 2022, consisting of 18 pages.

(Continued)

*Primary Examiner* — Bryan Y Lee
(74) *Attorney, Agent, or Firm* — Weisberg I.P. Law, P.A.

(57) ABSTRACT

A technique for enriching user plane traffic in a core network domain of a wireless communication network with sensual content different from audio content and video content is provided. A method of implementing the technique includes detecting user plane traffic that requires an enrichment with sensual content. The method further includes retrieving the sensual content from a database in the core network domain and enriching the user plane traffic with the retrieved sensual content.

16 Claims, 10 Drawing Sheets

Wireless Communication Network 100

(56) References Cited

U.S. PATENT DOCUMENTS

| | | | | |
|---|---|---|---|---|
| 2016/0171767 A1* | 6/2016 | Anderson | G06F 3/011 | |
| | | | 345/633 | |
| 2018/0199115 A1 | 7/2018 | Prasad | | |

OTHER PUBLICATIONS

3GPP TS 29.522 V17.2.0; 3rd Generation Partnership Project; Technical Specification Group Core Network and Terminals; 5G System; Network Exposure Function Northbound APIs; Stage 3 (Release 17); Jun. 2021, consisting of 257 pages.

Sodagar, I.; Title: Technologies under Consideration for Dynamic Adaptive Streaming over HTTP 23009, Parts 1, 3-6 and 8; Source: ISO/IEC JTC 1/SC 29/WG 03; MPEG Systems WG; Document Type: Output Document; Jul. 23, 2021, consisting of 114 pages.

* cited by examiner

300A

Wireless Communication Network 100

TECHNIQUE FOR ENRICHING USER PLANE TRAFFIC IN A CORE NETWORK DOMAIN WITH SENSUAL CONTENT

CROSS-REFERENCE TO RELATED APPLICATIONS

This application is a Submission Under 35 U.S.C. § 371 for U.S. National Stage Patent Application of International Application No.: PCT/EP2022/058857, filed Apr. 4, 2022 entitled "TECHNIQUE FOR ENRICHING USER PLANE TRAFFIC IN A CORE NETWORK DOMAIN WITH SENSUAL CONTENT," which claims priority to European Application No.: 22382176.0, filed Mar. 1, 2022, entitled "TECHNIQUE FOR ENRICHING USER PLANE TRAFFIC IN A CORE NETWORK DOMAIN WITH SENSUAL CONTENT," the entireties of both of which are incorporated herein by reference.

TECHNICAL FIELD

The present disclosure generally relates to wireless communication. In more detail, aspects in the context of enriching user plane traffic in a core network domain with sensual content different from audio and video content are presented. These aspects can be implemented as methods, computer program products, apparatuses and a system.

BACKGROUND

The consumption of digital content including audio (A) and video (V) content has become increasingly popular in the last decades. With the introduction of high speed wireless communication technologies of the 4th Generation (4G) and the 5th Generation (5G), such A/V content is today also heavily consumed via mobile consumer devices such as smartphones.

It is expected that the next decade will increasingly see the introduction of non-A/V digital content to enhance user experience, which is sometimes also referred to as the "Internet of Senses". As an example, scent technology (also called olfactory technology) enables controlling generation of an olfactory medium and can form the basis of scent-enabled digital content such as web pages, advertisements, video games, movies and music. As a further example, tactile technology targets at output of a haptic medium in the context of haptically enabled digital content. The resulting haptic user experience can relate to the perception and manipulation of objects using touch and proprioception. Proprioception is the sense of the relative positioning of one's body parts and the strength of effort used in a movement.

To experience non-A/V digital content, also called sensual content hereinafter, a content recipient will need a generator capable of generating tactile, scent-related or other non-A/V sensual media. A scent generator may, for example, be integrated into a television set that supports scent-enabled movies. A generator for tactile feedback can be integrated into a wearable device such as a glove.

With the widespread introduction of sensual content, content providers may wish to offer digital content such as scent-enabled movies to content recipients as streaming services. Other sensual content such as games or web pages offering tactile user experience may be offered by content providers for download as Internet services.

In these and other digital content provision scenarios, content providers face various challenges. For example, content providers may not be aware of whether or not a domain of a particular content recipient is technically capable of supporting output of sensual content. Some content providers may install a proprietary application on a content recipient device and exchange proprietary signalling with that application to determine capability information regarding sensual content support in the content recipient domain (e.g., to determine if a scent generator is installed). However, not all consumers may wish to install such applications, and not all content providers may have a proprietary application.

Another solution for implementing the Internet of Senses and similar sensual content services is the use of different uniform resource identifiers (URIs) for content access, depending on whether or not a given web browser or other Internet-enabled application in a content recipient domain is capable of supporting sensual content (e.g., http://internetofsense/app.html vs. http://app.html). One drawback of such an approach results from the fact that it may be difficult to duplicate or tag the URIs differently depending on the type of access (e.g., mobile vs. non-mobile access, etc.), which may be desirable to enhance user experience, or for other purposes.

It has also been found that sensual content may have different, potentially proprietary formats. For example, different content providers may use different formats for their proprietary scent generators. Moreover, the sensual content may consume substantial bandwidth as it is transmitted from a content provider domain to the content recipient domain, which is a particular challenge in case of a large number of parallel streaming sessions to multiple content recipients via an inherently bandwidth-limited wireless communication network.

SUMMARY

Accordingly, there is a need for a technique that avoids one more of the above or other drawbacks, and that enables an efficient transmission of sensual content from a content provider domain (CPD) to a content recipient domain (CRD).

A first aspect is directed at a method of enriching user plane traffic in a core network domain (CND) of a wireless communication network. The method comprises detecting user plane traffic that requires an enrichment with sensual content different from audio content and video content. The method further comprises retrieving the sensual content from a first CND database and enriching the user plane traffic with the retrieved sensual content.

A second aspect is related to a method of configuring user plane traffic enrichment in a CND of a wireless communication network. The method comprises the following steps performed in a CPD: receiving a capability disclosure message indicative of the CND supporting user plane traffic enrichment with sensual content as a service, wherein the sensual content is different from audio content and video content, and transmitting, in response to the capability disclosure message, a configuration message including at least one of a sensual type identifier, a sensual content identifier, and sensual content that is to be stored in the CND.

According to a third aspect, a method of controlling content provision by a CND of a wireless communication network is provided. The method comprises the following steps performed in a CRD: transmitting a control message to the CND, wherein the control message includes an indication of a communication channel for reception of sensual content different from audio content and video content, and receiving the sensual content via the indicated communication channel.

Also provided is a computer program product comprising program code portions for performing the steps of any of the method aspects presented herein when the computer program product is executed on at least one processor. The computer program product may be stored on a computer-readable recording medium.

Further still, an apparatus for configuring, from a CPD, user plane traffic enrichment in a CND of a wireless communication network is presented. The apparatus is configured to receive a capability disclosure message indicative of the CND supporting user plane traffic enrichment with sensual content as a service, wherein the sensual content is different from audio content and video content. The apparatus is also configured transmit, in response to the capability disclosure message, a configuration message including at least one of a sensual type identifier, a sensual content identifier, and sensual content that is to be stored in the CND.

Also presented is an apparatus for controlling, from a CPD, content provision by a CND of a wireless communication network. The apparatus is configured to transmit a control message to the CND, wherein the control message includes an indication of a communication channel for reception of sensual content different from audio content and video content. The apparatus is further configured to receive the sensual content via the indicated communication channel.

A network system of the present disclosure comprises two or more of the traffic enrichment apparatus, the content provisioning apparatus and the controlling apparatus.

BRIEF DESCRIPTION OF THE DRAWINGS

Further aspects, details and advantages of the present disclosure will become apparent from the detailed description of exemplary embodiments below and from the drawings, wherein.

DETAILED DESCRIPTION

Figure 1:
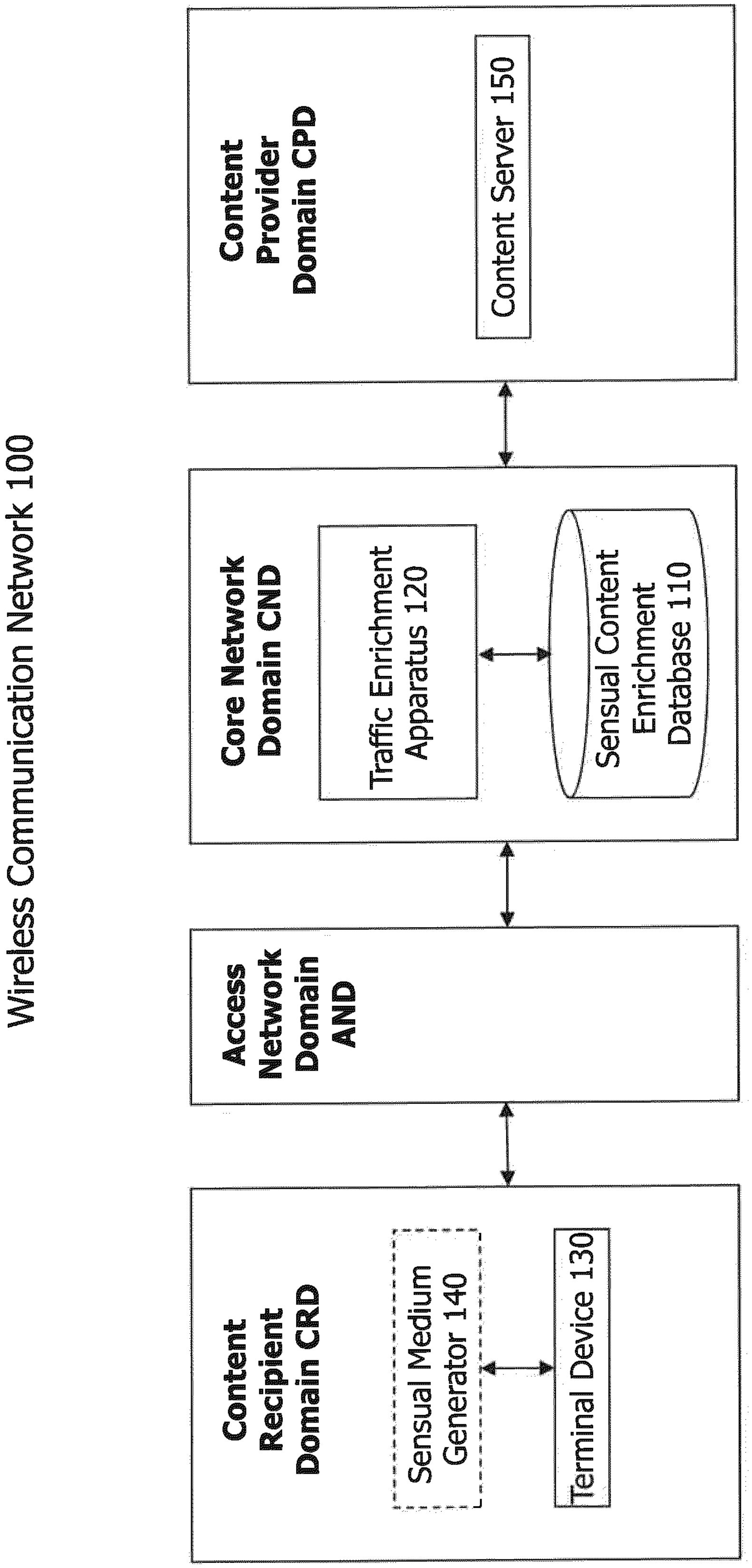
FIG. 1 is a diagram illustrating a system realization of the present disclosure.

In the following description, for purposes of explanation and not limitation, specific details are set forth in order to provide a thorough understanding of the present disclosure. It will be apparent to one skilled in the art that the present disclosure may be practiced in other embodiments that depart from these specific details.

While, for example, the following description focuses on an exemplary core network configuration in accordance with 5G specifications, the present disclosure is not limited in this regard. The present disclosure could, for example, also be implemented in other cellular or non-cellular wireless communication networks having a core network domain, such as those complying with 4G specifications (e.g., in accordance with the Long Term Evolution, LTE, specifications as standardized by the 3$^{rd}$ Generation Partnership Project, 3GPP).

Those skilled in the art will further appreciate that the steps, services and functions explained herein may be implemented using individual hardware circuits, using software functioning in conjunction with a programmed microprocessor or general purpose computer, using one or more application specific integrated circuits (ASICs) and/or using one or more digital signal processors (DSP). It will also be appreciated that when the present disclosure is described in terms of a method, it may also be embodied in one or more processors and one or more memories coupled to the one or more processors, wherein the one or more memories store one or more computer programs that perform the steps, services and functions disclosed herein when executed by one or more processors.

In the following description of exemplary realizations of the present disclosure, the same reference numerals denote the same or similar components.

In some of the realizations described hereinafter, a procedure is defined to store and retrieve non-A/V sensual content in digital form within a CND of a wireless communication network (e.g., to support Internet of Sense capabilities). The storage (and retrieval) may take place in (and from) a dedicated CND database, possibly in association with a subscriber database (assuming that a particular content recipient has a subscription to a wireless communication service).

FIG. 1 illustrates an embodiment of a wireless communication network 100 in which the present disclosure can be realized. The wireless communication network 100 may be configured as a mobile communication network operated by a mobile network operator (MNO).

As shown in FIG. 1, the wireless communication network 100 comprises a CPD and a CRD. The network 100 further comprises a CND and an access network domain (AND) logically arranged between the CPD and the CRD. In some variants, at least the CND and the AND are split into a user plane for transporting application traffic (e.g., digital content) and a control plane for transporting control signalling. As understood herein, a particular domain comprises one or more devices, nodes or functions under control of a particular domain owner, such as a content recipient (e.g., a subscriber), an MNO or a content provider.

The CND and the AND each comprises one or more network nodes or network functions (NFs). For example, the AND may comprise one or more access points or base stations (not shown) configured to establish one or more wireless communication links to the CRD. The CND comprises, among others, a sensual content enrichment database 110. The CND further comprises a traffic enrichment apparatus 120 configured to communicate with the sensual content enrichment database 110 (e.g., to access or write information into and read information from the sense enrichment database 110). The traffic enrichment apparatus 120 may be realized by one or more network nodes or NFs.

The CRD comprises one or more terminal devices 130 configured to wirelessly communicate with the AND, typically under a subscription regime. Exemplary terminal devices 130 comprise a user equipment- (UE-) type device (e.g., a smartphone, tablet or television set) or an Internet of Things- (IoT-) type device (e.g., a car or a wearable device such as a head-, hand- or body-mounted device) with wireless communication capabilities towards the AND.

The CRD further comprises, although not necessarily as an entity of the wireless communication network 100 as such, a sensual medium generator 140 capable of communicating with the terminal device 130 and of generating and rendering (i.e., outputting) at least one non-A/V sensual medium based on non-A/V sensual content wirelessly received by the terminal device 130.

In some implementations, the terminal device 130 and the sensual medium generator 140 are integrated into a single device, such as non-A/V sensual medium enabled television set that has wireless communication capabilities under a subscription and that can render, or output, at least one non-A/V medium (e.g., scent) in addition to conventional A/V media (e.g., to support scent-enabled movies). In other versions, the sensual medium generator 140 is a stand-alone device coupled to the terminal device 140 via a cable or a short-range wireless connection (e.g., Bluetooth). In such versions, the terminal device 130, or another device coupled to the terminal device 130, may be configured to render conventional A/V media such as movies, whereas the sensual medium generator 140 may be configured to render, in a synchronized manner with A/V media output, at least one associated sensual medium. In still further versions, the sensual medium generator 140 is configured as a wearable device (e.g., as a watch, helmet, glove or suit) configured to haptically output a tactile medium and, optionally, at least one A/V medium. In such versions, the terminal device 130 may, for example, be integrated into a head mounted display (HMD) or other wearable device configured to render a video in synchronization with haptic output rendered by the sensual medium generator 140. Evidently, such and other media rendering versions may be combined as desired.

Digital instructions for the sensual medium generator 140 to render one or more sensual media may take the form of a sensual content file, a sensual content stream or any other sensual content format. The sensual content may be received by the terminal device 130 in the context of reception of other digital content, in particular A/V content, and either together with or separate from that other digital content.

With reference to FIG. 1, the network 100 further comprises a CPD with a content server 150 (e.g., an Internet-based server offering media download or media streaming services). The content server 150 is configured to transmit digital content related to at least one sensual medium (such as a scent-enabled movie or haptically-enabled advertisement) to the terminal device 130. The digital content may be generated by an application hosted by the content server 150. The content transmission to the terminal device 130 takes place via the CND and the AND. The traffic enrichment apparatus 120 in the CND is configured to enrich the resulting CND user plane traffic originating from the CPD with sensual content.

Figure 2:
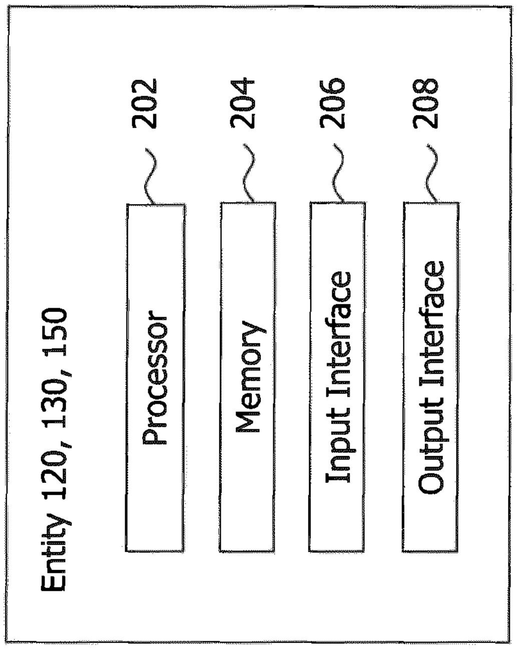
FIG. 2 is a block diagram illustrating an apparatus realization of the present disclosure.

In the following, exemplary realizations of each of the traffic enrichment apparatus 120, the terminal device 130 and the content server 150 will be explained with reference to FIG. 2. As illustrated in FIG. 2, in one exemplary hardware implementation, each of the entities 120, 130 and 150 comprises a processor 202 and a memory 204 coupled to the processor 202. The memory 204 stores program code that controls operation of the processor 202 to implement aspects of the present disclosure. As understood herein, the processor 202 may be implemented using any processing circuitry and is not limited to, for example, a single, localized processing core but may, for example, also have a distributed topology.

Each of the entities 120, 130 and 150 further comprises an optional input interface 206 and an optional output interface 208 for communication with other entities in the network 100 of FIG. 1. As an example, the input and output interfaces 206, 208 of the traffic enrichment apparatus 120 allow that entity 120 to retrieve sensual content from the sensual content enrichment database 110 and to write sensual content and related information into the sensual content enrichment database 120. Additionally, those interfaces 206, 208 allow the traffic enrichment apparatus 120 to receive information from, and transmit information to, one or both of the CPD and the CRD. As a further example, the input and output interfaces 206, 208 of the terminal device 130 allow that entity 130 to communicate with the AND and with the generator 140.

Exemplary modes of operation of the traffic enrichment apparatus 120 in the core network domain CND, the terminal device 130 in the CRD and the content server 150 in the CPD will now be described with reference to the flow diagrams 300A and 300B of FIG. 3. These modes of operation relate to enriching user plane traffic in the CND with sensual content different from audio content and video content. As explained with reference to FIG. 1, the user plane traffic originates from the CPD and, in more detail, from the content server 150. The content server 150 may host a Web application, a streaming application or any other application involving sensual content.

Before an actual content-based session between the content server 150 in the CPD and the terminal device 130 in the CRD takes place, the CND will be configured by the CPD for the provision of sensual content. An exemplary CND configuration phase is illustrated in the flow diagram 300A of FIG. 3A, and flow diagram 300B of FIG. 3B shows a later traffic enrichment phase. In some variants, the CND configuration phase may be omitted.

Figure 3A:
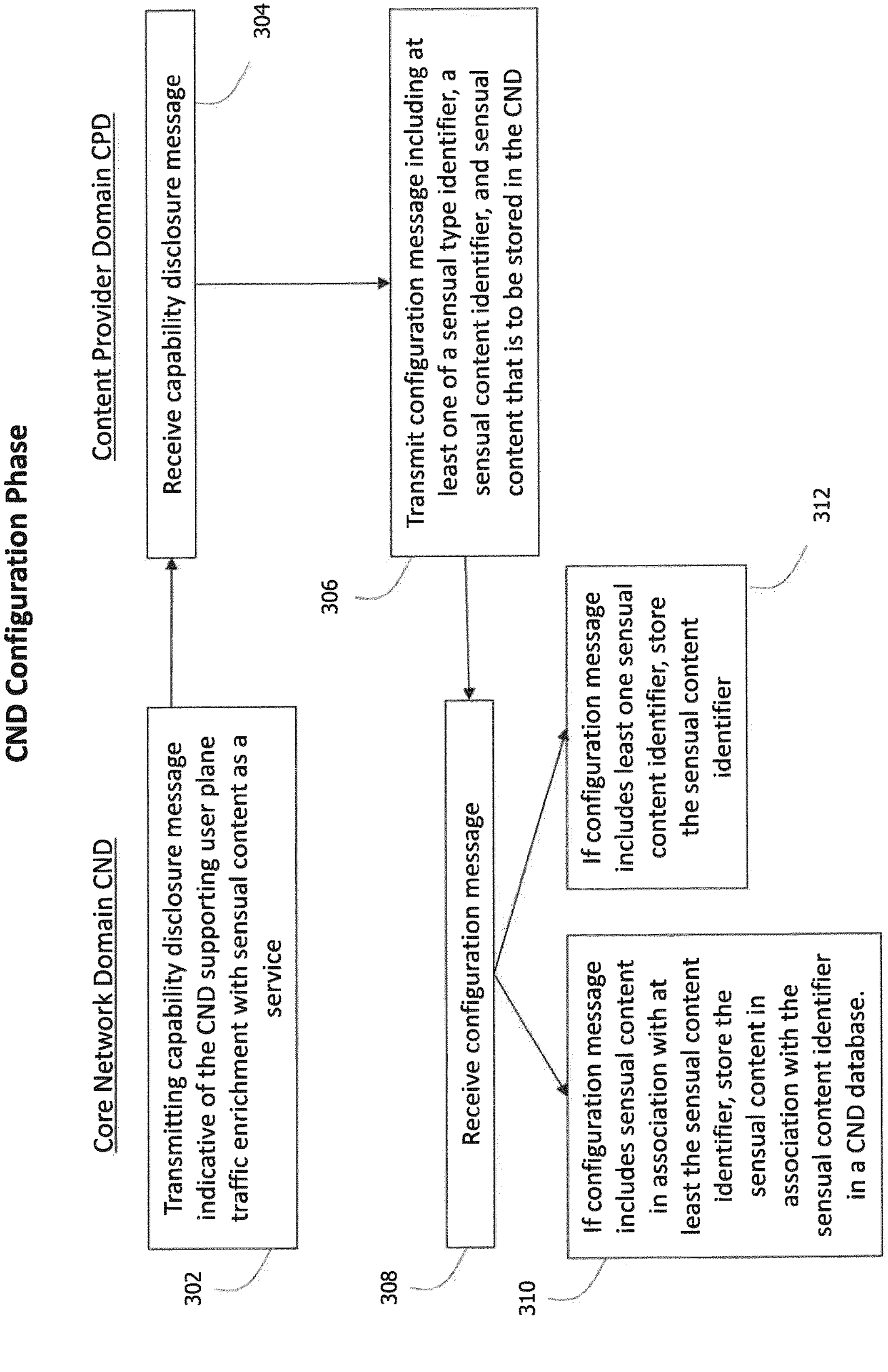
FIGS. 3A&B are flow diagrams illustrating method realizations of the present disclosure.
Figure 3B:
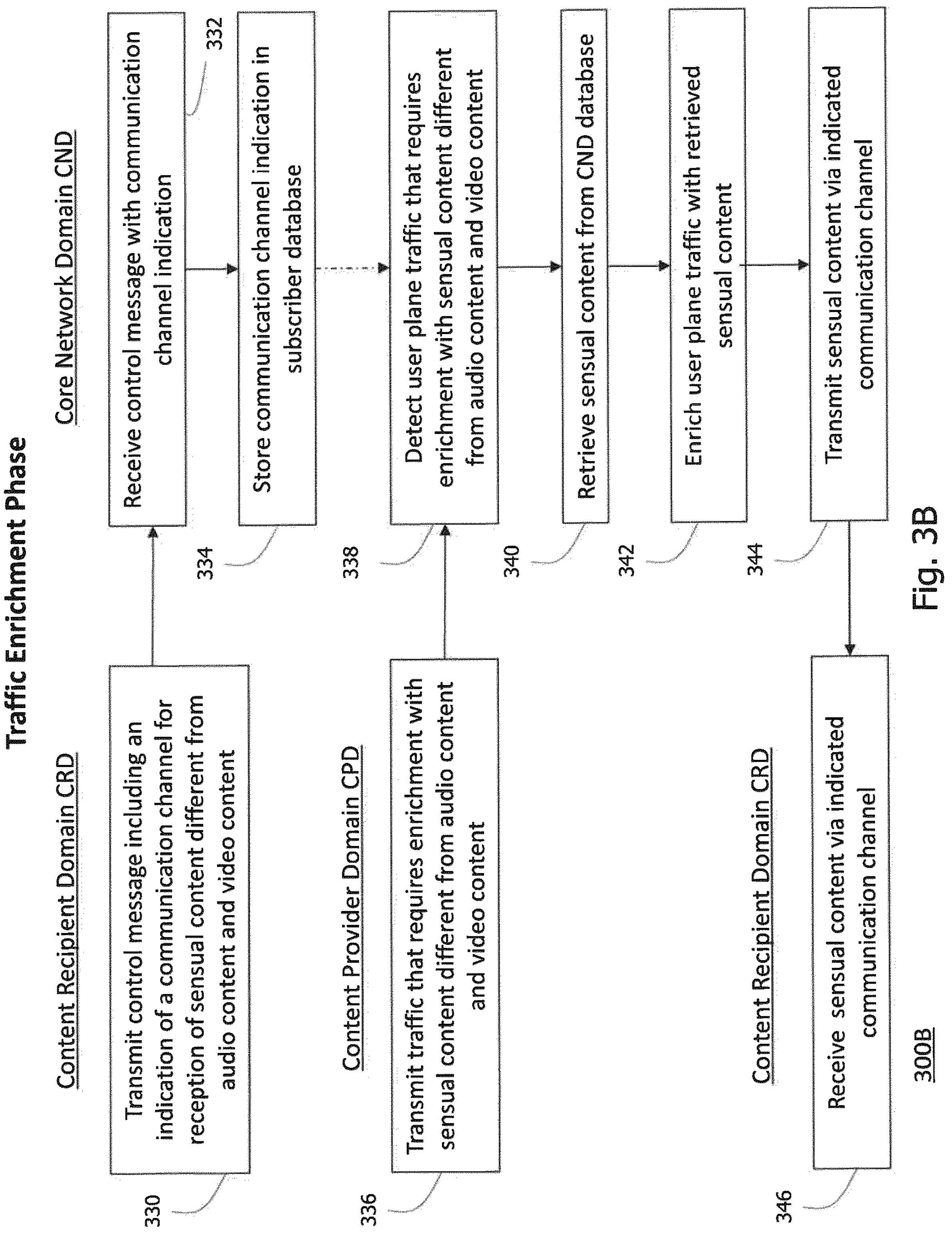

With reference to step 302 of FIG. 3A, configuration of the CND comprises transmitting a capability disclosure message from the CND to the CPD. The capability disclosure message is indicative of the CND supporting user plane traffic enrichment with sensual content as a service. As such, the capability disclosure message may simply convey the information "sensual content enrichment supported". In some cases, the capability disclosure message includes more detailed information. For example, the capability disclosure message may be indicative of one or more (e.g., a list of) sensual content identifiers of one or more dedicated items (e.g., one or more dedicated files) of sensual content supported by the CND. As an example, the items of sensual content supported by the CND may be stored (in association with their identifiers) in the sensual content enrichment database 110 of FIG. 1 and may thus be used by the traffic enrichment apparatus 120 for user plane traffic enrichment. A particular sensual content identifier may take the form of a pointer to a particular sensual content in the sensual content enrichment database 110 (e.g., in plaintext and/or integer format).

The capability disclosure message may additionally, or in the alternative, be indicative of one or more identifiers of one or more sensual types (e.g., scent type and tactile type) supported by the CND. In some variants, each sensual content identifier indicated in the capability disclosure message is associated with a sensual type identifier.

The capability disclosure message sent in step 302 is received by the CPD (e.g., by the content server 150 or another entity of the CPD) in step 304. Responsive to the capability disclosure message received in step 304, the CPD (e.g., the content server 150 or another entity of the CPD) transmits a configuration message to the CND in step 306. The configuration message triggers a CND-internal configuration of sensual content to be retrieved from the sensual content enrichment database 120 during the traffic enrichment phase. The configuration message includes one or more of a sensual type identifier (e.g., indicative of a tactile type and/or a scent type), a sensual content identifier, and sensual content.

In some cases, the CPD selects one or more sensual content identifiers from the list received with the capability disclosure message in step 304 and transmits the selected sensual content identifiers with the configuration message to the CND in step 306. The selected sensual content identifiers relate to sensual content that is to enrich later user plane traffic originating in the CPD. If, for example, the user plane traffic pertains to a scent-enabled Web page relating to different flowers, a selected first sensual content identifier may identify a scent content item controlling the sensual medium generator 140 to generate the scent of roses, and a selected second sensual content identifier may identify a scent content item controlling the sensual medium generator 140 to generate the scent of tulips.

In such or other cases, the CPD may also find that the required sensual content is not, or not entirely, on the list received with the capability disclosure message in step 304, or the message received in step 304 may simply not include such a list. If the CPD has stored the required sensual content locally, it may transit same with the configuration message to the CND (see step 306). The configuration message may then additionally include a sensual content identifier associated with the transmitted sensual content for later referencing purposes. The configuration message may optionally further include a sensual type identifier (e.g., indicative of a scent type or a tactile type) associated with the transmitted sensual content. The configuration message may include at least one of a sensual content identifier and a sensual type identifier for each sensual content item (e.g., scent of daisies and scent of cloves) sent with the configuration message.

The configuration message is received by the CND in step 308. The CND stores the information received with the configuration message locally in the CND. Depending on the content of the configuration message, the CND may store the received sensual content in association with the received sensual content identifier in the sensual content enrichment database 110, optionally in further association with the received sensual type identifier, see step 310 in FIG. 3A. In case the configuration message includes one or more selected sensual content identifiers of sensual content already available in the sensual content enrichment database 110, the CND may store the received one or more content identifiers, see step 312, for later use (e.g., by an interfacing function located in the CND and facing towards the CPD). In each case, additionally an identifier of at least one of a content provider and a CPD application generating the user plane traffic to be enriched may be stored in association with the corresponding configuration information in the CND (e.g., in the sensual content enrichment database 110).

After the CND configuration phase illustrated in FIG. 3A has been completed, the traffic enrichment phase as shown in the flow diagram 300B of FIG. 3B may take place. The traffic enrichment phase is generally triggered from the CRD, for example by the terminal device 130 transmitting a dedicated control message via the AND to the CND, see FIG. 1. The dedicated message may be a session establishment message for triggering establishment of a content transmission session.

In some variants, the session establishment message transmitted by the terminal device 130 includes control information for controlling content transmission by the CND. As illustrated by step 330 of FIG. 3B, the control information may comprise an indication of a communication channel for reception of sensual content different from audio content and video content in the CRD. In some variants, a dedicated communication channel indication may be provided per sensual type.

In some implementations, the session establishment message may thus be regarded to constitute a control message for controlling content provision by the CND. In other variants, such a control message may be transmitted separately (e.g., before or after) transmission of the session establishment message.

The control information with the communication channel indication is received by the CND, either in the session establishment message or in a dedicated control message, in step 332. The communication channel indication is then stored in a subscriber database of the CND (i.e., in association with subscriber information such as a subscriber identifier).

In some implementations, the communication channel indication may be an indication that allows the user terminal 130 to logically separate the received non-A/V sensual content from other content, such as regular A/V content. In some implementations, the communication channel indication may take the form of a port number (e.g., as locally assigned by the user terminal 130).

In response to, or simply after, the session establishment message with the communication channel indication that is sent by the terminal device 130 in step 330, the content server 150 transmits the requested application traffic in step 336 to the CND (and via the AND to the CRD with the terminal device 130). The traffic (with, e.g., regular A/V content such as a movie or an audio stream) does not include sensual content, but requires sensual content enrichment. The required sensual content is stored in the sensual content enrichment database 110 and has been preconfigured as explained above with reference to the flow diagram 300A of FIG. 3A)

In step 338, the CND detect on its user plane the traffic transmitted by the CPD in step 336. In particular, the CND detects that the user plane traffic requires enrichment with sensual content. There exist various possibilities for performing this detection. For example, the CND may apply a dedicated analytics algorithm (e.g., based on deep packet inspection). In another example, the CPD may have notified the CND of one or more digital content flows that require such an enrichment, so that the CND has to detect those flows. In a still further example, the CND may apply one or more dedicated traffic detection rules to the user plane traffic. In some variants, the one or more traffic detection rules may have been generated in the CND responsive to information received from one or both of the CPD and the CRD.

As an example, the one or more traffic detection rules may have been generated in the context of session establishment for the terminal device 130 as dedicated content recipient. A least some of the information for generating the one or more traffic detection rules may have been received by the CND with the configuration message (see step 308 in FIG. 3A) or with a subscription message (as explained in greater detail below) from the CPD. Other information for generating the one or more traffic detection rules may have been received by the CND with the control message from the CRD (see step 330 in FIG. 3B). The one or more traffic detection rules may be generated by a first CND function (e.g., on a control plane) and may then be communicated to a second CND function in charge of user plane traffic analysis.

In step 340, the sensual content required for enriching the detected user plane traffic is retrieved from the sensual content enrichment database 110. The particular sensual content to be retrieved may have been preconfigured (e.g., as part of the one or more traffic detection rules or in association therewith).

Then, in step 342, the detected user plane traffic is enriched with the sensual content retrieved in step 340. In some variants, enriching the user plane traffic with the retrieved sensual content comprises transmitting the retrieved sensual content in-band with the user plane traffic that requires enrichment (i.e., that does not include the sensual content). This in-band transmission can be done using the same so-called 5 tuple than the one that is used to transmit the traffic in need of enrichment. A 5 tuple designates a Transmission Control Protocol/Internet Protocol (TCP/IP) connection. It includes a source IP address/port number, destination IP address/port number and the protocol in use. In other variants, enriching the user plane traffic with the retrieved sensual content comprises transmitting the retrieved sensual content out-of-band with the user plane traffic that requires an enrichment (e.g., using a different 5 tuple than the one used to transmit the traffic in need of enrichment). In some cases, the control information received by the CND in step 332, i.e., the communication channel indication, is configured to control if the received sensual content is transmitted in-band or out-of-band.

At least the detecting, retrieving and enriching steps 338, 340 and 342 may be performed by a user plane function (UPF) of a 5$^{th}$ Generation-enabled CND or a user plane packet data network gateway (PGW-U) of a 4$^{th}$ Generation-enabled CND.

In step 344, the sensual content is transmitted from the CND to the CRD. In step 346, the terminal device 130 receives the sensual content via the indicated communication channel. As an example, the sensual content may be received in association with an indication of a communication channel (e.g., a port number) signalled by the terminal device 130 in step 330. Digital content different from the sensual content, such as regular A/V content, may be received in association with a different port number or no specific port number.

The sensual content received by the terminal device 130 in step 330 via the communication channel indicated in step 330 will be forwarded to the sensual medium generator 140 for rendering. Any regular A/V content may be rendered by the terminal device 130 directly or by a dedicated rendering device such as a television set. The regular A/V content may comprise control instructions indicative of when the sensual medium generator 140 is to render which sensual content. In this manner, rendering of the regular A/V content and the sensual content can be synchronized.

User plane traffic enrichment with sensual content may be supported by the CND as a service on a subscription basis. In this case, the CND may receive a subscription message from the CPD. The subscription message may be received by a network exposure function (NEF) of a 5$^{th}$ Generation-enabled CND or a service capability exposure function gateway (SCEF) of a 4$^{th}$ Generation-enabled CND.

The subscription message may include an indication of the (selected) service type "user plane traffic enrichment with sensual content". In such a case, the detecting, retrieving and enriching steps 338, 340, 342 may be performed as a result of receipt of the subscription message by the CND.

The subscription message may further include one or more of the following informational items: an identifier of an application server or application function in the CPD as originator of the user plane traffic, an identifier of an application in the CPD generating the user plane traffic, a sensual type identifier, a sensual content identifier, and a content recipient identifier. These items of information may then be stored in at least one second CND database, such as a subscriber database or a database in charge of storing session context information. One or more of the items of information may later be retrieved (e.g., for the generation of traffic detections rules). Such information retrieval may take place when an actual session is started (e.g., for or by a dedicated terminal device 130).

The above general realizations of the present disclosure will now be described in greater detail with reference to certain technical specifications (TSs) defined by the 3$^{rd}$ Generation Partnership Project (3GPP) for 5G communication systems. 3GPP TS 23.501 V15.4.0 (2018-12) and later defines architectural aspects of a 5G service based architecture (SBA). According to this SBA, NFs use service-based interactions to consume services from other NFs. The discovery of services and of NFs producing them is provided by a network repository function (NRF). Service producing NFS register, update or deregister their profiles in the NRF. Service consuming NFs discover services offered by NF producer instances by querying the NRF about NF instances offering services of a given type. NFs may subscribe and unsubscribe to changes in the status of NFs registered in the NRF, as explained above for the exemplary service type "user plane traffic enrichment with sensual content". Based on such subscriptions, the NRF may notify NFs of status changes of other NFs.

Figure 4:
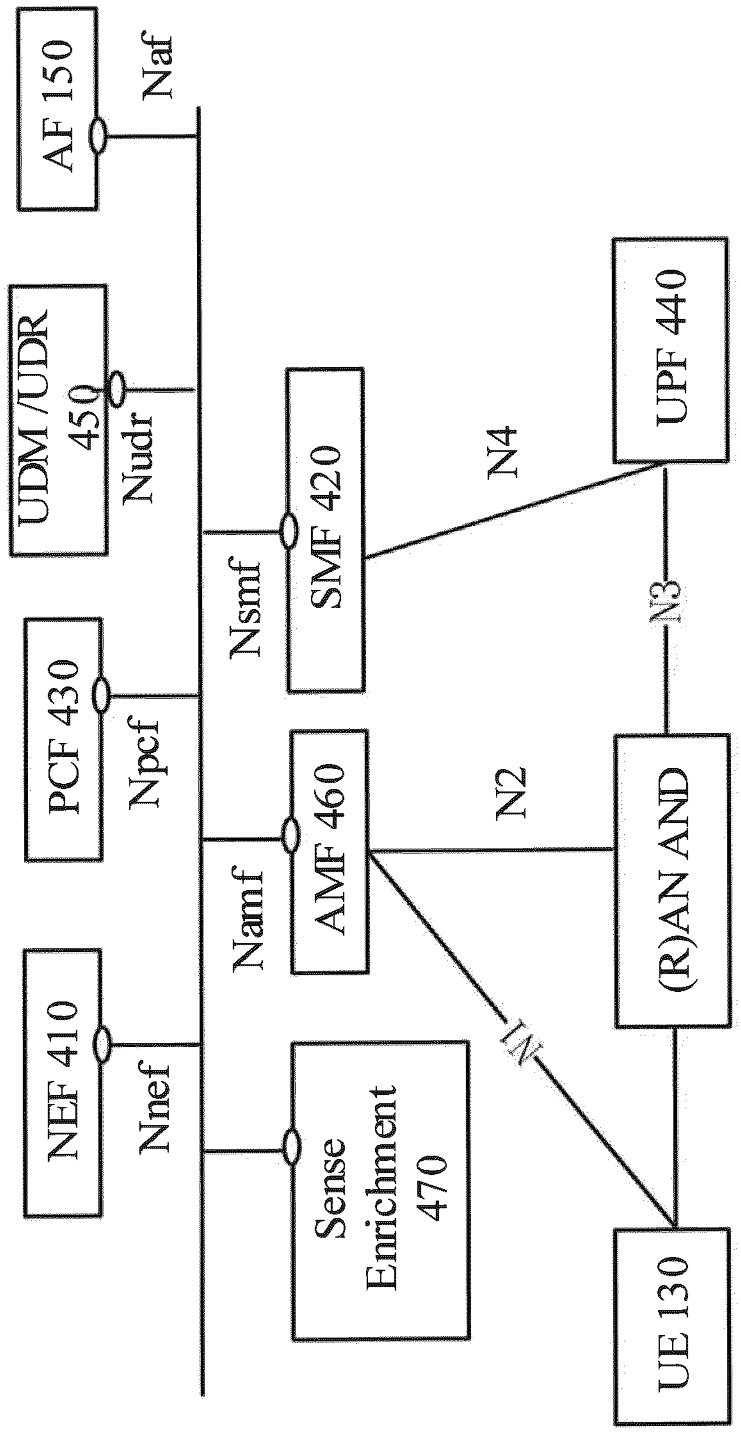
FIG. 4 is a diagram illustrating an exemplary 5G network architecture that can form the basis of realizations of the present disclosure.

FIG. 4 depicts a portion of the 5G reference architecture as defined by 3GPP (see, e.g., Section 4.2.3 of 3GPP TS 23.501 V15.4.0 and later). The relevant architectural core network entities (i.e., NFs), core network interfaces and other network entities for some realizations of the present disclosure include the following:

A user equipment (UE) is an exemplary terminal device 130 (see FIG. 1). UE 130 constitutes, for example, an endpoint of a non-A/V sensual medium enabled streaming or download session that stretches via the AND and the CND. The AND is configured as a radio access network (RAN). In some variants, the UE 130 is configured to output, or to trigger output, of at least one non-A/V sensual medium in the CRD (e.g., via the generator 140 illustrated in FIG. 1)

An application function (AF) is typically implemented as, or on, the content server 150 operated by a dedicated content provider (e.g., an over-the-top, OTT, entity). The AF 150 is configured to interact with the CND via an Naf interface and, in particular, via one or more dedicated exposure APIs. The AF 150 is in some implementations configured to provide non-A/V sensual medium enabled streaming or download services.

An NEF 410 has an Nnef interface and supports different functionalities. Specifically, in the context of the present disclosure, the NEF 410 acts as an entry point into the CND for the AF 150. The AF 150 thus interacts with the CND through the NEF 410. 3GPP has defined an exposure framework with a northbound interface between the AF 140 and the NEF 410 that supports dedicated APIs, including, as an option in the present context, an API to exchange information between the CND and the CPD about CND capabilities in regard of traffic enrichment and associated CPD configuration information.

A Session Management Function (SMF) 420 has N4 and Nsmf interfaces. The SMF 420 supports procedures such as session establishment, modification and release as well as policy-related functionalities. The SMF 420 is configured to receive Policy and Charging Control (PCC) rules from a Policy Control Function (PCF) 430. Moreover, the SMF 420 configures a User Plane Function (UPF) 440 accordingly through the N4 interface using the Packet Forwarding Control Protocol (PFCP).

A UPF 440 has an N4 interface to SMF 420 and an N3 interface to AND. The UPF 440 supports handling of user plane traffic (i.e., digital content) based on the rules received via the SMF 420 from the PCF 430. Specifically, in certain variants of the present disclosure, the UPF 440 supports traffic inspection (through packet detection rules, PDRs), and further supports the application of associated traffic handling actions such as traffic enrichment with sensual content, traffic steering, QoS enforcement, charging/reporting, and so on. In some variants, UPF 440 implements the traffic enrichment apparatus 120 of FIG. 1 or at least a component thereof.

PCF 430 supports, via an Npcf interface, a unified policy framework to govern the CND behavior. Specifically, PCF 430 provides PCC rules to SMF 420 and/or UPF 440 to detect user plane traffic that requires enrichment with sensual content and to enforce policy and charging decisions according to the PCC rules.

A unified data management (UDM) entity 450 domain centrally handles data (in particular subscriber information) in the core network domain CND. To this end, UDM 450 hosts or has access to a unified data repository (UDR) that acts as subscriber database. The UDM 450 itself may store session context information for later retrieval by the PCF 430 when a session is created.

In some realizations, the sensual content enrichment database 110 may be hosted by the UDR. In other realizations, the sensual content enrichment database 110 may be configured as part of a dedicated new NF in the 5G network architecture. In FIG. 4, this new NF 500 is denoted as "Sense Enrichment".

An access and mobility management function (AMF) 460 handles access and mobility for UE 130.

In certain realizations, at session establishment, UE 130 sends a non A/V medium (support) indicator to inform the CND that it can handle sensual content (other than audio/video content). AMF 460 forwards this new indication to SMF 420. SMF 420 registers (i.e., stores) in UDM/UDR 450 this new indication (e.g., as part of the subscriber or session data to indicate that this subscriber's session is capable of handling non-A/V sensual content).

In the following description, exemplary 5G signaling realizations implementing aspects of the present disclosure will be described with reference to FIGS. 5 to 9 and the 5G entities discussed above with reference to FIG. 4. It will be apparent to one skilled in the art that similar signaling realizations will apply in case of a 4G or a combined 4G/5G implementation.

Figure 5:
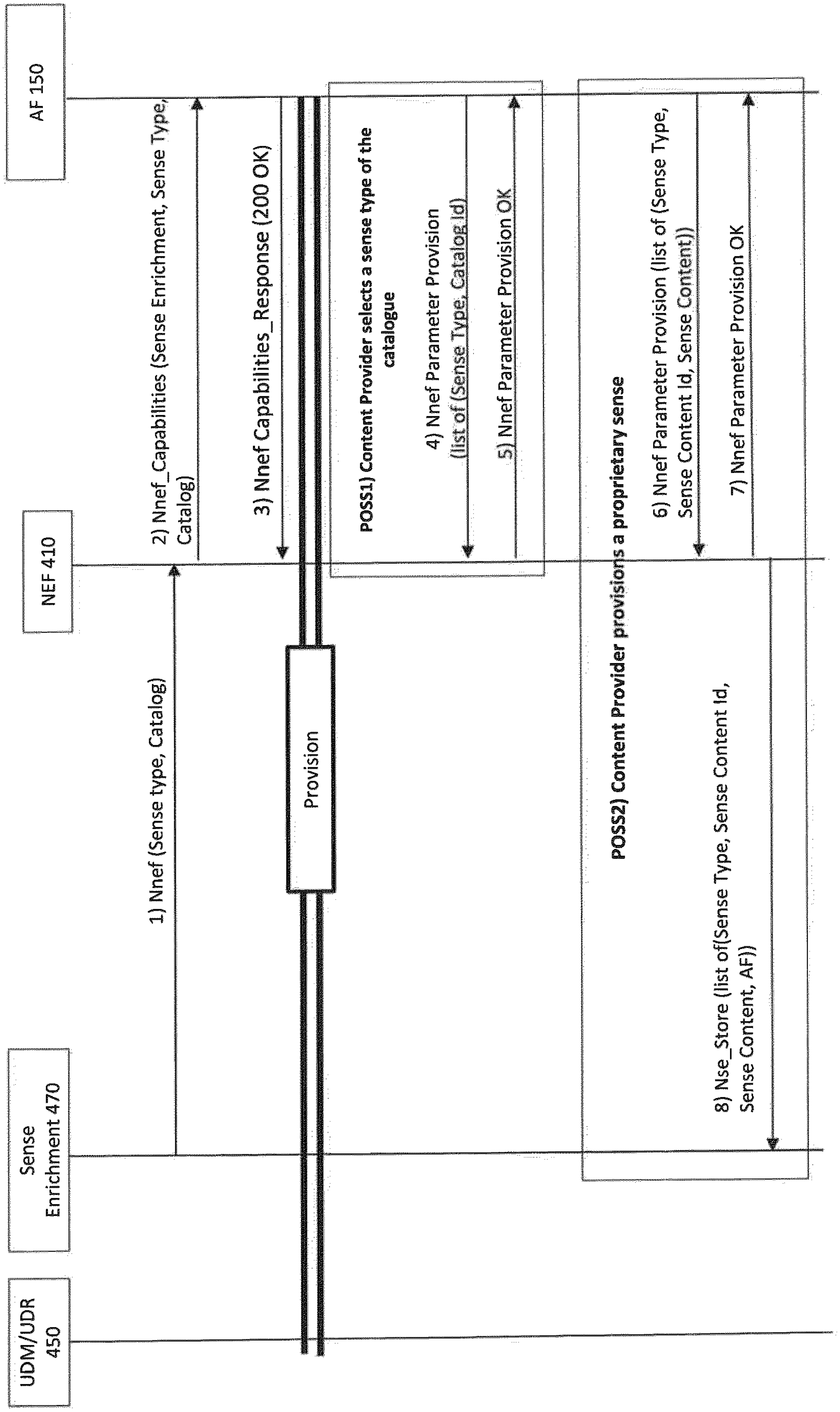
FIGS. 5 to 9 are schematic signalling diagrams illustrating further realizations of the present disclosure based on the 5G network architecture of FIG. 4.

FIG. 5 shows an example of the 5G signaling procedure for implementing the CND configuration phase discussed above with reference to FIG. 3A. In the signaling procedure of FIG. 5, the CND exposes a new capability for user plane traffic enrichment with sensual content. To this end, CND discloses a catalog of available sensual content to the CPD and offers a procedure for storing new sensual content provided by content providers.

In step 1) of FIG. 5, the new Sense Enrichment NF 470 transmits capability information in the form of at least sensual content catalog to the NEF 410. The catalog contains information about the sensual content and the sensual type for which enrichment services can be provided by the NF 470. For each sensual type (e.g., tactile or scent), a dedicated catalog may be transmitted. In other variants, a single catalog relating to sensual content of multiple sensual types is transmitted. The catalog may in some variants include a dedicated identifier for each item of sensual content (e.g., a corresponding catalog ID).

In step 2) of FIG. 5, the NEF 410 exposes the capability information in a capability disclosure (i.e., "exposure") message to the AF 150 in the CPD (see also step 302 in FIG. 3A). In many cases, this message will be sent to multiple AFs 150 of different content providers. The capability disclosure message includes the following parameters:

Sense Enrichment: a service permitting a content provider to enrich its digital content with sensual content Sensual Type: scent or tactile Catalog: list of available non-A/V sensual content per sensual type (e.g., a list of corresponding sensual content identifiers)

In step 3) of FIG. 5, AF 150 confirms receipt of the capability disclosure message.

Then, AF 150, based on catalog provided in capability disclosure message or in consideration of proprietary sensual content, decides about the sensual content needed for user plane traffic enrichment in the CND and creates a corresponding configuration message. There exist various possibilities in this regard.

A first possibility is indicated by step 4) in FIG. 5. If AF 150 selects one of the sensual contents provided by the NF 170 in its catalog, then AF 150, using the standardized Nnef Parameter Provision service (see also step 306 in FIG. 3A), informs the CND accordingly. The corresponding configuration message may have the following content:

Example 1

Sensual type: smell

Catalog ID=1 (e.g., it corresponds to sensual content required in the context of cooking meal)

Example 2

Sensual Type: tactile

Catalog ID=7 (e.g., smooth like cotton)

In step 5) of FIG. 5, the NEF 410 confirms receipt of the configuration message. The NEF 410 may store this information locally, for example for later retrieval by the PCF 430 (not shown in FIG. 5). The PCF 430 may use the information for generating one or more traffic detection rules, or for other purposes.

A second possibility (combinable with the first possibility) is indicated by step 6) in FIG. 5. The AF 150 may not want to have its digital content enriched with sensual content provided by the NF 470, but may want its own sensual content to be used for user plane traffic enrichment in the CND. To this end, the AN 150, again using the Nnef Parameter Provision service, transmits to the CND its proprietary sensual content with an associated sensual content identifier and an indication of the type the sensual which sense type belongs to. The corresponding configuration message may include the following exemplary information:

Sensual Type: scent

Sensual Content ID=187 (may be proprietary ID of content provider)

Sensual content file

It is to be noted that both, the parameter Sensual Content ID and the parameter Catalog ID are examples of sensual content identifiers. The parameter Catalog Id is used for identifying a sensual content item selected from a catalog (i.e., a list) of sensual content items readily available in the sensual content enrichment database 110, whereas the parameter Sensual Content ID is used for identifying a sensual content item externally provided by the CPR.

In step 7) of FIG. 5, the NEF 410 confirms receipt of the configuration message, and in step 8 it transmits this information to sense enrichment NF 470 (see also step 310 in FIG. 3A) to be stored in the sensual content enrichment database 110 (see FIG. 1). The corresponding storage request may include the following parameters:

Sensual Type: scent
Sense Content ID=187
Sensual content file
AF: Identifier of the content provider that provided this content.

The AF parameter maps on a Catalog ID owner in the sensual content enrichment database 110. This means that each content provider may "own" one or more Catalog IDs with the associated sensual content. Such a mapping will, for example, help to differentiate between sensual content of different content providers even if they happen to use the same (proprietary) sensual content identifier.

In the signaling procedure of FIG. 5, the UDM 450 is configured to support a new service (with, e.g., Event-ID=SenseEnrichment) to expose enrichment-related context information on a subscription basis towards the CND (e.g., to AF 150) through NEF 410. As such, a subscription scheme is defined that allows a particular CPD (e.g., through an AF 150) to subscribe to the new service through NEF 410 using a subscription message.

Figure 6:
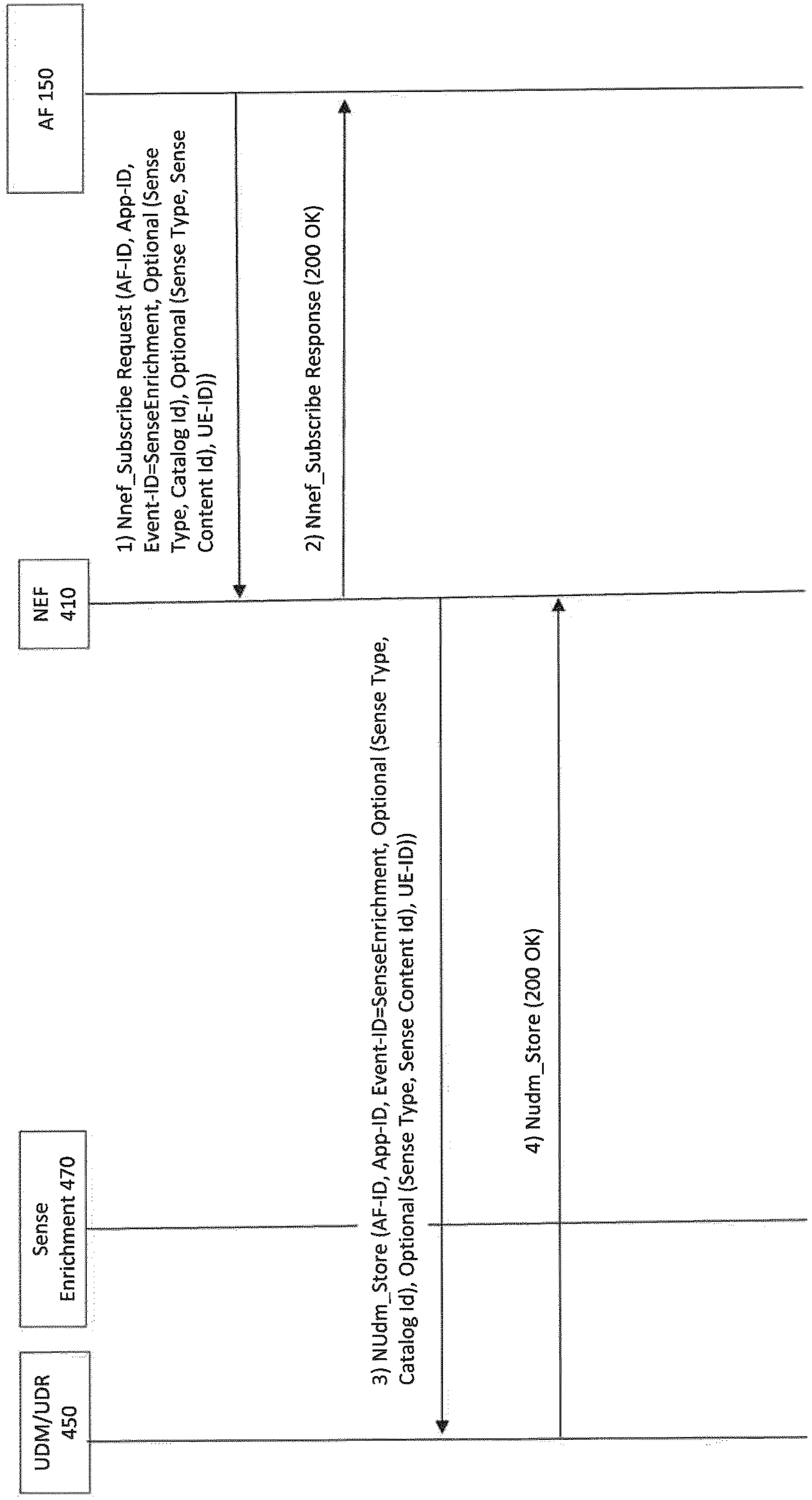

In step 1) of FIG. 6, AF 150 transmits a subscription message to NEF 410 so as to subscribe to the new SenseEnrichment service. The subscription message defines the following parameters:

AF-ID (e.g., =Netflix Inc)
App-ID (e.g., =Netflix)
UE-ID: Identifier of a specific UE or indication of "anyUE" (all of them)
Event-Id=Sense Enrichment
At least one of these optional parameter sets must be included:
- Option 1: One of the sensual contents included in the catalog provided by NF 470
  - Sensual Type: scent or tactile
  - Catalog ID: identifier of the sensual content in the catalog
- Option 2: One of the proprietary sensual contents provided by the content provider operating AF 150
  - Sensual Type: scent or tactile
  - Sensual Content ID: proprietary identifier of the sensual content
  - Sensual Content: an (e.g., binary) sensual content item (e.g., including the data required to control the sensual medium generator 140 to generated the scent of a rose)

The parameter App-ID not being present or not being associated with any particular parameter value (such as "Netflix") can be interpreted in certain variants as being indicative of "any App".

In step 2) of FIG. 6, the NEF 410 confirms the subscription message. It may also answer negatively, for example if sensual content ID does not correspond to any sensual content in the sensual content enrichment database 110 or in other cases.

In step 3) of FIG. 6, NEF sends information of received with the subscription message in step 1) towards the UDM 450 for storage. In step 4) of FIG. 6, the UDM 450 confirms the NEF request of step 3).

Figure 7:
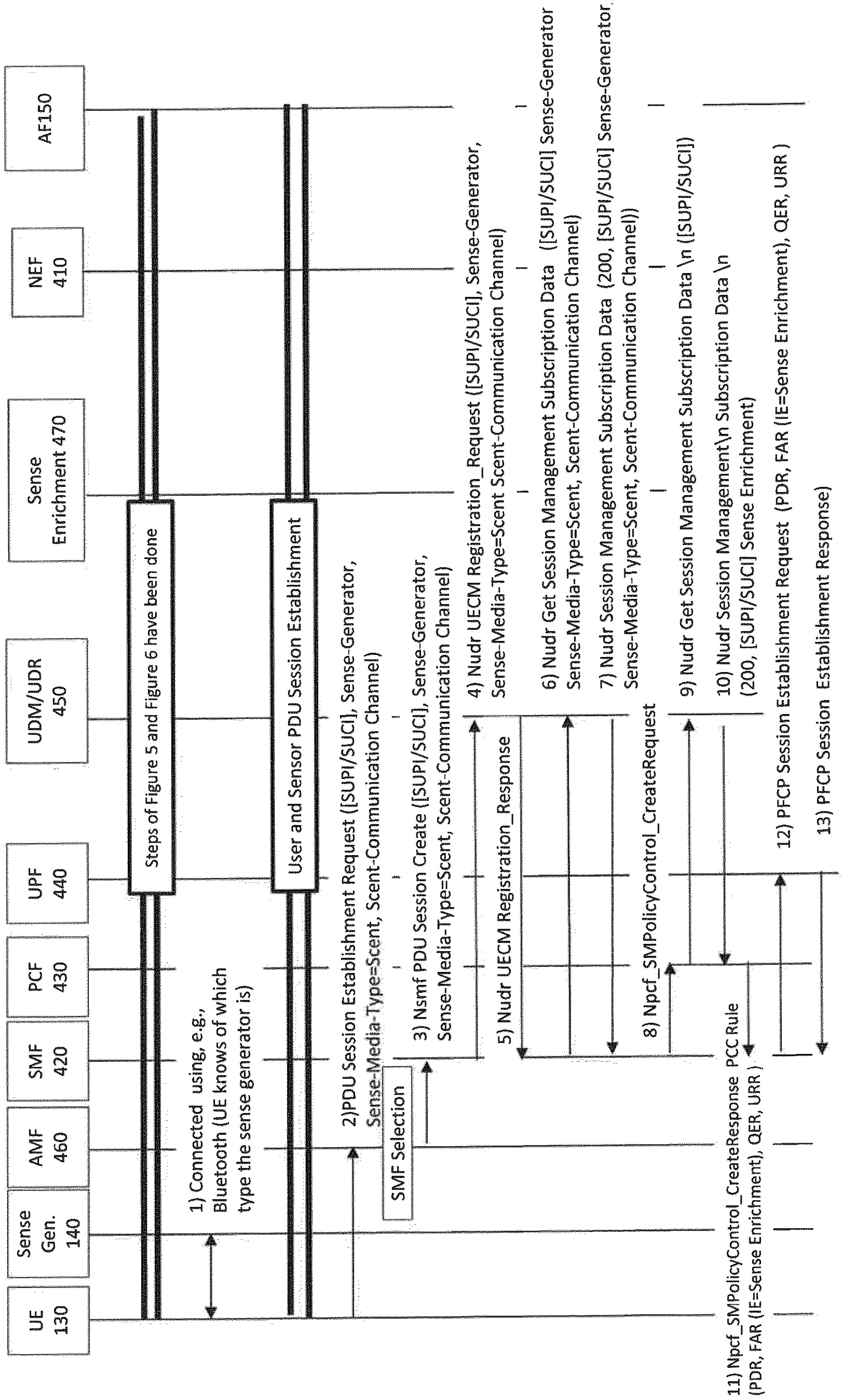
Figure 8:
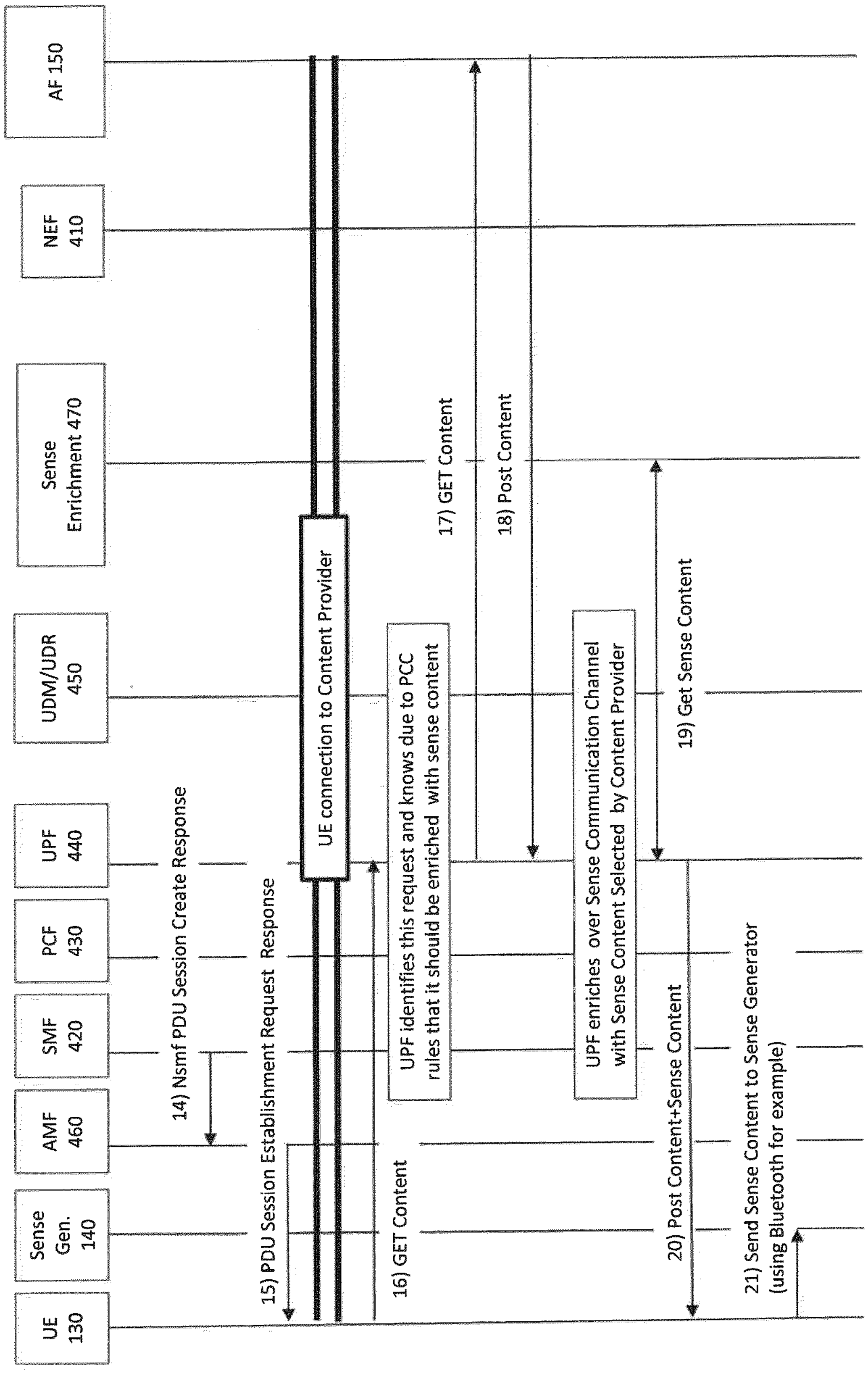

FIGS. 7 and 8 illustrate an example of the 5G signaling procedure for implementing the traffic enrichment phase discussed above with reference to FIG. 3B. The signaling diagrams of FIGS. 7 and 8 illustrate the steps of session establishment and also the associated digital content transmission session. FIGS. 7 and 8 relate to a subscription scenario in which AF 150 has initiated a subscription as explained above with reference to FIG. 6. In other realizations, in particular in non-5G realization, no subscription context may be given.

In signaling step 1) of FIG. 7, UE 130 will connect using, for example, personal area network (PAN) connectivity to sensual medium generator 140. Bluetooth and other technologies can be used also. As an alternative not depicted in the drawings, the generator 140 may have a subscriber identity module (SIM) that can connect to the AND (see FIG. 1). As such the generator 140 can be configured as a UE.

Using signaling between UE 130 and generator 140, or using a pre-configured context, UE 130 knows the type of generator 140 it is connected to. In this example, it is a scent generator 140 capable of providing an olfactory medium.

In step 2) of FIG. 7, UE 130 triggers a PDU Session Establishment Request towards the CND (here: AMF 460). The corresponding message includes a subscription-related identifier of UE 130 (e.g., its subscription permanent identifier, SUPI, or subscription concealed identifier, SUCI, as exemplary UE-ID) and a parameter informing the CND about CRD capabilities in regard to support of at least one non-A/V sensual medium. This parameter is exemplarily called SenseGenerator. It is a Boolean parameter, but other formats can be included as well. In the present realization, the parameter is associated with an optional indicator (Sense-Media-Type) defining which type of non-A/V sensual medium is supported. In this case, the indicator has the value "Scent" (i.e., is indicative of olfactory medium support by the generator 140 in the CRD).

Moreover, the PDU Session Establishment Request includes an optional further parameter "Scent-Communication Channel" (see step 330 in FIG. 3B). This parameter indicates a dedicated communication channel of the UE 130 for reception of the sensual content (here: the scent-related content). In some implementations, the communication channel takes the form of a port number at the UE 130. The communication channel (e.g., port) for receiving the sensual content may be the same as the communication channel for receiving the remaining digital content ("in-band" scenario) or two different communication channels may be used ("out-of-band" scenario). Each communication channel may map on, or may be represented by, a so-called 5 tuple.

In step 3) of FIG. 7, the AMF 460 sends a Nsfm Session Create message to the SMF 420. This messages includes the UE-ID, the subscriber capability information (SenseGenerator, Sense-Media-Type) and the communication channel indication received from the UE 130 in step 2).

Then, in signaling step 4) of FIG. 7, the SMF 420 registers the UE-ID, subscriber capability information and communication channel indication in UDM 450 with its associated UDR by way of a Nudr_UECM_Registration_Request message. In more detail, the subscriber capability information and the communication channel indication are registered in a user profile of the subscription associated with the UE-ID of UE 130. The registered information includes the parameter SenseGenerator and the associated value Sense-Media-Type=Scent plus the communication channel indication. In step 5), the UDM 450 acknowledges the registration with a registration response message.

In step 6) of FIG. 7, the SMF 420 requests subscription profile information from the UDM 450 in a Nudr_Get_Session_Management_Subscription_Data message, and in signaling step 7), the UDM 450 sends the requested information (as retrieved from UDR) to the SMF 420. This information includes the subscriber capability information (SenseGenerator, Sense-Media-Type) and the communication channel indication as transmitted by UE 130 in step 2).

In signaling step 8) of FIG. 7, the SMF 420 establishes an association with the PCF 440. In more detail, the SMF 420 selects the PCF 430 for session handling, considering that the current session needs "SenseGenerator with Sense-Media-Type=Scent" capabilities.

In step 9) of FIG. 7, the PCF 430 retrieves subscription data for the UE-ID from the UDM 450 (see also the above explanation given with reference to FIG. 6). In more detail, the PCF 430 queries the UDM 450 for any specific subscriber policies. In step 10), the UDM 450 responds to the PCF 450 with an indication that sense enrichment is needed for the particular UE-ID.

Then, in signaling step 11) of FIG. 7, the PCF 430 responds to the SMF 420. In more detail, the PCF 430 transmits the policies that need to be applied by an UPF 440 on the user plane. In the present case, the PCF 430 transmits a new parameter in a forwarding action rule (FAR) for traffic detection on the user plane. The new parameter may in some variants take the form of a new information element (IE) to be supplemented in the Forwarding Parameter IEs in Table 7.5.2.3-2 of 3GPP technical specification TS 29.244 V17.3.0 (December 2021).

The new IE may be designated "Sense Enrichment" and may be optional. This IE may be present if the UPF 440 indicated support of Sense Enrichment of downlink traffic towards the CRD. When present it shall contain information for sense enrichment.

The Sense Enrichment IE type may be defined as shown in the table below. It may be of a new type=300 not used in the current specification. The Sense Enrichment IE will contain information related to enrichment with sensual content and information that permits retrieval of the required sensual content from the sensual content enrichment database 110.

| | Bits | | | | | | | |
|---|---|---|---|---|---|---|---|---|
| Octets | 8 | 7 | 6 | 5 | 4 | 3 | 2 | 1 |
| 1 to 2 | Type = 300 (decimal) | | | | | | | |
| 3 to 4 | Length = n | | | | | | | |
| 5 | Spare | | | Sense Type | | | | |
| 6 | Length of Sense Field Name | | | | | | | |
| 7 to m | Sense Field Name | | | | | | | |
| p | Length of Sense Field Value | | | | | | | |
| (p + 1) to q | Sense Field Value | | | | | | | |
| s to (n + 4) | These octet(s) is/are present only if explicitly specified | | | | | | | |

The Sense Type indicates the type of the sensual content as follows:

| Sense Type | Value (Decimal) |
|---|---|
| Scent | 0 |
| Tactile | 1 |
| Spare, for future use. | 2 to 31 |

The parameters are defined as follows:

Length of Sense Field Name indicates the length of the Sense Field Name.

Sense Field Name shall be encoded as an OctetString.

Length of Sense Field Value indicates the length of the Header Field Value

Sense Field Value shall be encoded as an OctetString.

In step 12) of FIG. 7, the SMF 420 establishes and selects a connection towards a UPF 440. In more detail, it selects a UPF 440 for session handling considering the subscriber capability information (including "SenseGenerator with Sense-Media-Type=Sent"). Moreover, the SMF 420 transmits the PDR with the FAR including the Sense Enrichment IE, as explained above. In step 13), the selected UPF 40 acknowledges to the request from the SMF 420.

Now referring to FIG. 8, the SMF 420 in step 14) acknowledges the AMF request as received in step 3), and in signaling step 13, AMF 460 acknowledges the UE request as received in step 2). At this point, the PDU session is established.

It will be appreciated that generator 140 may be enabled, or activated, for some sessions and not enabled, or deactivated, for other sessions. As such, the validity of the subscriber capability information will be limited in the UDM 450 to a single PDU session for digital content transmission. The subscriber capability information in the UDM 450 may thus be deleted when the session is terminated.

With continued reference to FIG. 8, in signaling steps 16) and 17), the UE 130 requests digital content from AF 150. In the present example, the requested digital content includes sensual content for the generator 140 to render an olfactory medium (e.g., in the context of video or audio streaming or in the context of an advertisement). The UE's request for non-A/V sensual content-enabled media is identified by the UPF 440 based on the PCC rules, and the UPF 440 infers that there is a requirement of user plane traffic enrichment with sensual content. The UPF 440 may detect traffic in a "regular" manner, i.e., based on PDR matching for a certain App-ID, which is associated with an FAR indicating an enrichment action (in this case, the enrichment is with sensual content).

In step 18), the AF 150 starts transmitting the digital content requested by the UE 130. The digital content transmitted by the AF 150 lacks the sensual content that is to be provided by the CND (see also step 336 in FIG. 3B).

The UPF 440 detects, on its user plane, digital content traffic transmitted by the AF 150 in step 18). Since the UPF 440 has inferred in step 16) that there is a requirement of user plane traffic enrichment with sensual content, it uses the content of the Sensual Enrichment IE in the FAR to retrieve the required sensual content from the sensual content enrichment database 110 of the AF 470 (see signaling step 19) of FIG. 8 and step 340 of FIG. 3B). The trigger for the UPF 440 to perform step 19) is the detection of downlink traffic (step 18) of FIG. 8) matching the PDR for the App-ID associated with an FAR for a content enrichment action (with the sensual content retrieved by the UPF 440 from the database 110).

In some variants, the Sensual Enrichment IE in the FAR includes the sensual content identifiers of the sensual content to be retrieved from the from the sensual content enrichment database 110 in step 19) of FIG. 8. In step 20), the digital content traffic transmitted by the AF 150 in step 18) and the sensual content retrieved from the from the sensual content enrichment database 110 in step 19) are transmitted to the UE 130. In other words, the user plane traffic is enriched with the retrieved sensual content (see step 342 of FIG. 3B)

upon being transmitted from the CND to the UE 130 on the communication channel indicated previously (see step 344 of FIG. 3B). As explained above, the sensual content may be transmitted in-band our out-of-band with respect to the digital content traffic originating at the AF 150. As has been explained above, in-band and out-of-band transmissions can be controlled via usage of the same or different 5 tuples for the sensual content and the digital content that requires enrichment.

In step 21) of FIG. 8, the sensual content received by the UE 130 on the indicated communication channel is sent to the sensual medium generator 140 for controlling operation thereof. The sensual medium generator 140 processes the sensual content and generates, or renders, the sensual medium (e.g., a particular scent) in correspondence with the processed sensual content. The sensual medium is in some variants generated in synchronicity with rendering of a visual and/or audible medium in correspondence with the digital content transmitted by the AF 150 in step 18).

Figure 9:
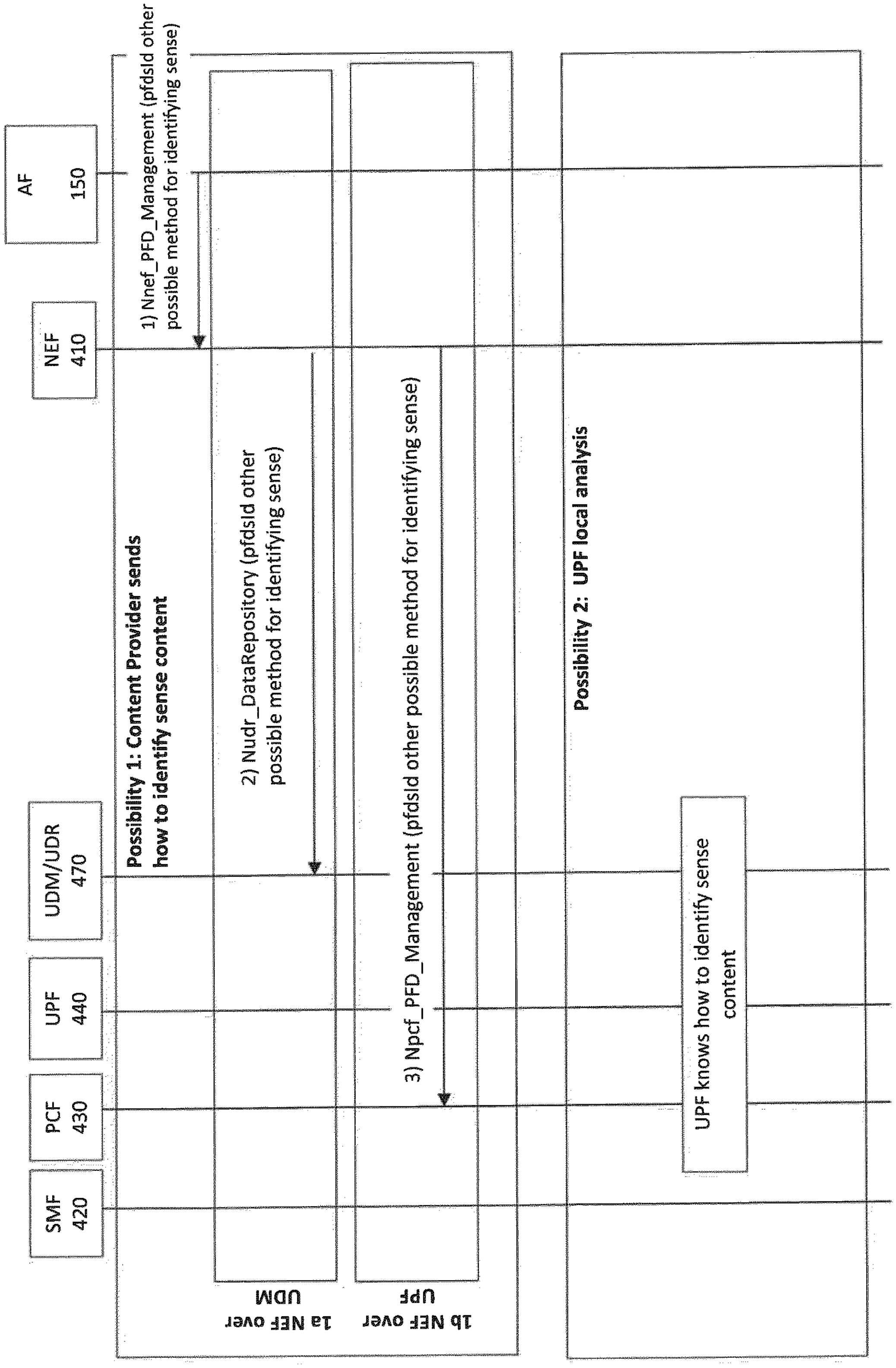

In some implementations, the identification of user plane traffic that requires enrichment with sensual content may be different from the scenario illustrated in FIGS. 7 and 8. FIG. 9 illustrates two examples of 5G signaling procedures in this regard.

According to a first possibility illustrated in FIG. 9, the AF 150 provides one or more packet flow description (PFDs) to the NEF 410, see signaling step 1). The NEF 410 forwards the PFD information either to the UDM 450 for storage in the UDR (see signaling step 2) in FIG. 9) or directly to the UPF 440 via the PCF 430 (see signaling step 3) in FIG. 9). For example, the AF 150 of a content provider such as Facebook or YouTube can indicate for each user or group of users the PFDs that need to be enriched with sensual content. Upon detection of the associated flows by the UPF 440, the UPF 440 retrieves the required sensual content from the sensual content enrichment database 110 and transmits it to the UE 130.

According to a second possibility illustrated in FIG. 9, the UPF 440 locally performs a traffic analysis to identify the user plane traffic that requires enrichment with sensual content. To this end, the UPF 440 may have been provided with a suitable analytics algorithm (e.g., based on deep packet inspection).

The variants of FIG. 9 correspond to the case where the CND does not have knowledge on how to identify the application traffic, specifically the traffic which needs to be enriched with sensual content. As illustrated in FIG. 9, the CND may reuse the existing PFD Management procedure. The UPF 440 may detect the traffic (see step 16) in FIG. 8) based on the PDR matching procedure (in this case using the PFDs-pfdsId-provisioned by the AF 150 in FIG. 9).

As has become apparent from the above description of exemplary realizations, the technique presented herein allows MNOs to support the "Internet of Senses" in their 4G/5G-enabled networks. At the same time, content providers are assisted in the provision of enhanced digital content using "Internet of Senses" technology via wireless and in particular mobile communications networks. Moreover, MNOs are enabled to specifically select core network capabilities (e.g., NFs such as PCFs and/or UPFs) that can best assist the provision of non-A/V sensual content from a CPD to a CRD. In some variants, the traffic load between the CPD and the CND can be reduced as now the CND is enabled to enrich user plane traffic with sensual content.

The invention claimed is:

1. A method of enriching user plane traffic in a core network domain, CND, of a wireless communication network, the method comprising:

detecting user plane traffic that requires an enrichment with sensual content different from audio content and video content;

retrieving the sensual content from a first CND database;

enriching the user plane traffic with the retrieved sensual content; and transmitting a capability disclosure message to a content provider domain, the capability disclosure message being indicative of the CND supporting user plane traffic enrichment with sensual content as a service, the capability disclosure message being indicative of at least one of one or more identifiers of one or more sensual types and one or more identifiers of one or more sensual contents supported by the CND.

2. The method of claim 1, wherein the user plane traffic originates from a content provider domain, CPD, and wherein the sensual content to be retrieved from the first CND database has been configured by the CND in response to a configuration message from the CPD.

3. The method of claim 2, comprising receiving the configuration message from the CPD, the configuration message including at least one of a sensual type identifier, a sensual content identifier, and sensual content.

4. The method of claim 3, wherein the configuration message includes the sensual content in association with at least the sensual content identifier, and comprising storing the sensual content in association with the sensual content identifier in the first CND database.

5. The method of claim 1, wherein user plane traffic enrichment with sensual content is supported by the CND as a service on a subscription basis.

6. The method of claim 5, comprising receiving a subscription message from a, or the, content provider domain, CPD, wherein the subscription message includes an indication of the service, and wherein the detecting, retrieving and enriching steps are performed responsive to the subscription message.

7. The method of claim 6, wherein the subscription message further includes one or more of the following informational items: an identifier of an application server or application function in the CPD as originator of the user plane traffic in the CND, an identifier of an application in the CPD generating the user plane traffic, a sensual type identifier, a sensual content identifier, and a content recipient identifier.

8. The method of claim 7, wherein the subscription message is received by a network exposure function, NEF, of a $5^{th}$ Generation-enabled CND or a service capability exposure function gateway, SCEF, of a $4^{th}$ Generation-enabled CND.

9. The method of claim 6, comprising storing one or more of the informational items in a second CND database.

10. The method of claim 1, wherein detecting the user plane traffic comprises at least one of:

applying one or more traffic detection rules to the user plane traffic;

performing traffic analytics;

detecting predefined traffic flows.

11. The method of claim 10, comprising receiving, from at least one of a content provider domain, CPD, and a content recipient domain, CRD, information for generating the one or more traffic detection rules.

12. The method of claim 11, wherein the information for generating the one or more traffic detection rules is at least partially received in the context of establishment of a session for a dedicated CRD.

13. The method of claim 11, wherein the user plane traffic originates from a content provider domain, CPD, and the sensual content to be retrieved from the first CND database has been configured by the CND in response to a configuration message from the CPD, wherein the information for generating the one or more traffic detection rules is at least partially received in the configuration message from the CPD.

14. The method of claim 1, wherein the sensual content is configured to control a generator capable of outputting a sensual medium.

15. The method of claim 1, further comprising receiving a configuration message from the CPD, the configuration message including at least one of a sensual type identifier, a sensual content identifier, and sensual content, wherein the configuration message includes at least one of the one or more sensual type identifiers and the one or more sensual content identifiers indicated in the capability disclosure message.

16. An apparatus for enriching user plane traffic in a core network domain, CND, of a wireless communication network, the apparatus comprising:

a processor and a memory coupled to the processor to configure the apparatus to:

detect user plane traffic that requires an enrichment with sensual content different from audio content and video content;

retrieve the sensual content from a first CND database;

enrich the user plane traffic with the retrieved sensual content; and transmit a capability disclosure message to a content provider domain, the capability disclosure message being indicative of the CND supporting user plane traffic enrichment with sensual content as a service, the capability disclosure message being indicative of at least one of one or more identifiers of one or more sensual types and one or more identifiers of one or more sensual contents supported by the CND.

* * * * *